(12) United States Patent
Li

(10) Patent No.: US 10,607,312 B2
(45) Date of Patent: Mar. 31, 2020

(54) METHOD AND APPARATUS FOR PUBLISHING LOCATIONAL COPYRIGHTED WATERMARKING VIDEO

(71) Applicant: Nokia Technologies Oy, Espoo (FI)

(72) Inventor: Desheng Li, Anhui (CN)

(73) Assignee: NOKIA TECHNOLOGIES OY, Espoo (FI)

(*) Notice: Subject to any disclaimer, the term of this patent is extended or adjusted under 35 U.S.C. 154(b) by 160 days.

(21) Appl. No.: 15/533,147

(22) PCT Filed: Dec. 18, 2014

(86) PCT No.: PCT/CN2014/094246
§ 371 (c)(1),
(2) Date: Jun. 5, 2017

(87) PCT Pub. No.: WO2016/095169
PCT Pub. Date: Jun. 23, 2016

(65) Prior Publication Data
US 2018/0025462 A1    Jan. 25, 2018

(51) Int. Cl.
*G06K 9/00*    (2006.01)
*G06T 1/00*    (2006.01)
(Continued)

(52) U.S. Cl.
CPC ............ *G06T 1/0085* (2013.01); *G06F 21/16* (2013.01); *G06T 1/0028* (2013.01);
(Continued)

(58) Field of Classification Search
None
See application file for complete search history.

(56) References Cited

U.S. PATENT DOCUMENTS 7,100,050 B1    8/2006    Coppersmith et al.
8,045,749 B2    10/2011    Rhoads et al.
(Continued)

FOREIGN PATENT DOCUMENTS

CN    1656501 A    8/2005
CN    101277438 A    10/2008
(Continued)

OTHER PUBLICATIONS

Office action received for corresponding Japanese Patent Application No. 2017-533179, dated Aug. 14, 2018, 4 pages of office action and 5 pages of translation available.
(Continued)

*Primary Examiner* — Wei Wen Yang
(74) *Attorney, Agent, or Firm* — Squire Patton Boggs (US) LLP

(57) ABSTRACT

Method and apparatus are disclosed for publishing locational copyrighted watermarking video. According to some embodiments, a method for embedding location information into a video comprises: separating the video into at least one key frame and at least one in-between frame set corresponding to the at least one key frame; receiving location data for the at least one key frame; encrypting the location data for the at least one key frame based on a location private key; and embedding the encrypted location data into the at least one key frame.

13 Claims, 15 Drawing Sheets

(51) Int. Cl.
  *G06F 21/16* (2013.01)
  *H04L 29/06* (2006.01)
  *H04N 5/913* (2006.01)
  *H04N 19/467* (2014.01)

(52) U.S. Cl.
  CPC ........... *H04L 63/061* (2013.01); *H04N 5/913* (2013.01); *G06F 2221/2111* (2013.01); *G06T 2201/0051* (2013.01); *G06T 2201/0052* (2013.01); *G06T 2201/0064* (2013.01); *G06T 2201/0065* (2013.01); *G06T 2201/0083* (2013.01); *H04N 19/467* (2014.11); *H04N 2005/91335* (2013.01)

(56) References Cited

U.S. PATENT DOCUMENTS

| | | |
|---|---|---|
| 2002/0126870 A1 | 9/2002 | Wendt |
| 2003/0031318 A1 | 2/2003 | Troyansky et al. |
| 2003/0215110 A1 | 11/2003 | Rhoads et al. |
| 2004/0091111 A1 | 5/2004 | Levy et al. |
| 2005/0169499 A1 | 8/2005 | Rodriguez et al. |
| 2008/0192818 A1* | 8/2008 | DiPietro ........... H04L 29/12783 375/240.01 |
| 2009/0087020 A1 | 4/2009 | Yamaguchi et al. |
| 2013/0011005 A1 | 1/2013 | Mamidwar et al. |
| 2014/0222612 A1 | 8/2014 | Knudson et al. |
| 2014/0270337 A1 | 9/2014 | Zhao et al. |
| 2014/0270338 A1* | 9/2014 | Zhao ............... G06T 1/0021 382/100 |
| 2014/0327738 A1* | 11/2014 | Jacobs ............ G02B 27/017 348/43 |
| 2014/0359679 A1* | 12/2014 | Shivadas ........... H04N 21/8455 725/90 |

FOREIGN PATENT DOCUMENTS

| | | |
|---|---|---|
| CN | 101854530 A | 10/2010 |
| CN | 102377974 A | 3/2012 |
| CN | 102547254 A | 7/2012 |
| CN | 102680992 A | 9/2012 |
| CN | 102946531 A | 2/2013 |
| CN | 203313297 U | 11/2013 |
| CN | 103685960 A | 3/2014 |
| CN | 103873954 A | 6/2014 |
| JP | 2002176630 A | 6/2002 |
| JP | 2002320085 A | 10/2002 |
| JP | 2004501529 A | 1/2004 |
| JP | 2007528644 A | 10/2007 |
| JP | 2008027336 A | 2/2008 |
| WO | 2001/067667 A1 | 9/2001 |

OTHER PUBLICATIONS

Upadhyay et al., "Video Authentication: Issues and Challenges", International Journal of Computer Science Issues, vol. 9, No. 1, No. 3, Jan. 2012, pp. 409-418.
Extended European Search Report received for corresponding European Patent Application No. 14908204.2, dated May 18, 2018, 9 pages.
International Search Report and Written Opinion received for corresponding Patent Cooperation Treaty Application No. PCT/CN2014/094246 , dated Sep. 21, 2015, 12 pages.
Office Action received for corresponding European Patent Application No. 14908204.2, dated Mar. 14, 2019, 4 pages.
European Office Action corresponding to EP Appln. No. 14 908 204.2, dated Oct. 23, 2019.
Chinese Office Action corresponding to CN Appln. No. 201480084136.3, dated Dec. 3, 2019.

* cited by examiner

METHOD AND APPARATUS FOR PUBLISHING LOCATIONAL COPYRIGHTED WATERMARKING VIDEO

RELATED APPLICATION

This application was originally filed as Patent Cooperation Treaty Application No. PCT/CN2014/094246 filed Dec. 18, 2014.

FIELD OF THE INVENTION

Embodiments of the disclosure generally relate to video publishing, and, more particularly, to locational copyrighted watermarking video publishing.

BACKGROUND

The facticity and copyright of video attract attention of people more today when vast amount of videos are emerging on the Internet. Sometimes, due to the ease of modifying any video by any person, the viewer could not distinguish the original with the tampered. On the other hand, the video author may subscribe some content providers for publishing his/her video clips, so his/her video clips should be protected from copyright infringement.

In view of this, it would be advantageous to provide a way to allow for efficiently and securely conducting video publishing.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one aspect of the disclosure, it is provided a method for embedding location information into a video, the method comprising: separating the video into at least one key frame and at least one in-between frame set corresponding to the at least one key frame; receiving location data for the at least one key frame; encrypting the location data for the at least one key frame based on a location private key; and embedding the encrypted location data into the at least one key frame.

According to another aspect of the disclosure, it is provided a method for extracting location information from a video, the method comprising: separating the video into at least one key frame and at least one in-between frame set corresponding to the at least one key frame; extracting encrypted location data from the at least one key frame; and decrypting the encrypted location data based on a location public key.

According to another aspect of the disclosure, it is provided a method for abstracting a sketch vector array of a video, the sketch vector array comprising a plurality of key frames of the video and a plurality of location data corresponding to the plurality of key frames, the method comprising: mapping the sketch vector array onto a location axis; and removing duplicate sketch vectors whose location data are close to each other on the location axis.

According to another aspect of the disclosure, it is provided a method for hiding at least first and second copyright watermark data into a video, the method comprising: separating the video into at least one key frame and at least one in-between frame set corresponding to the at least one key frame; and merging the at least first and second copyright watermark data into the at least one key frame.

According to another aspect of the disclosure, it is provided a method for decoding a copyright watermark data from a video, the method comprising: separating the video into at least one key frame and at least one in-between frame set corresponding to the at least one key frame; reading a data structure from the at least one key frame, the data structure having stored therein at least first and second copyright watermark data; and decoding the first or second copyright watermark data according to a property of the data structure.

According to another aspect of the disclosure, it is provided an apparatus comprising means configured to perform all steps of any one of the above described methods.

According to another aspect of the disclosure, it is provided an apparatus comprising: at least one processor; and at least one memory including computer-executable code, wherein the at least one memory and the computer-executable code are configured to, with the at least one processor, cause the apparatus to perform all steps of any one of the above described methods.

According to another aspect of the disclosure, it is provided a computer program product comprising at least one non-transitory computer-readable storage medium having computer-executable program code stored therein, the computer-executable code being configured to, when being executed, cause an apparatus to operate according to any one of the above described methods.

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
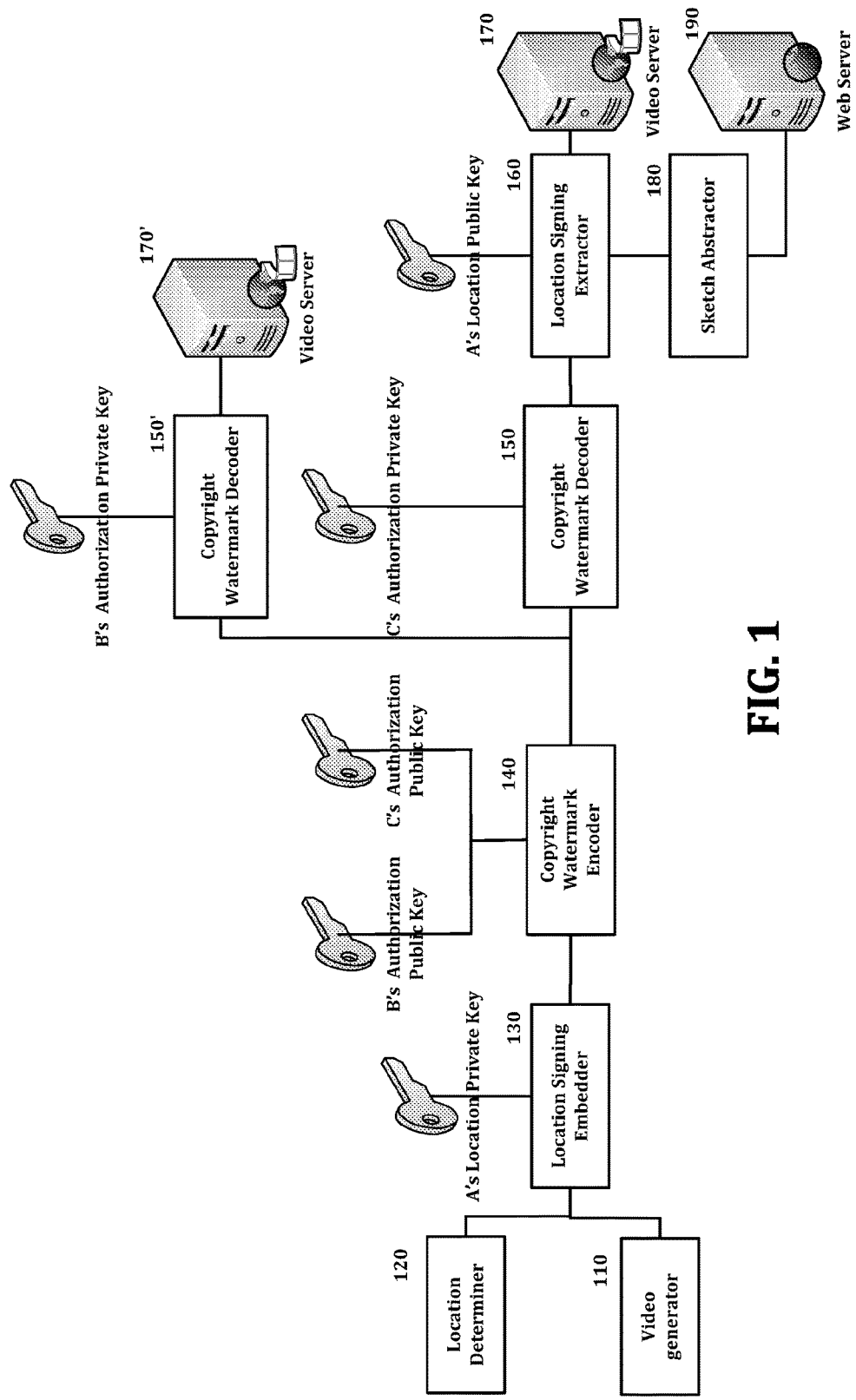
FIG. 1 shows an exemplary video publishing system according to an embodiment of the present disclosure.

FIG. 1 shows an exemplary video publishing system according to an embodiment of the present disclosure. As shown, the exemplary video publishing system 100 may comprise a video generator 110, a location determiner 120, a location signing embedder 130, a copyright watermark encoder 140, copyright watermark decoders 150 and 150', a location signing extractor 160, video servers 180 and 180', a sketch extractor 170, and a web server 190.

The video generator 110 may generate video stream signal sequences. For example, the video generator 110 may be a separate apparatus, or a component contained in a device such as a mobile phone or an on-board equipment. The exemplary examples of the video generator 110 may comprise, but not limited to, a digital video camera, a digital television camera, a portable video camera, a phone camera, a video recorder, and so on.

The location determiner 120 may determine the location for the video stream signal sequences generated by the video generator 110. For example, the location determiner 120 may be a Global Positioning Systems (GPS) receiver which may be a component attached to or contained in the video generator 110, or a component integrated with the video generator 110 into a device such as a mobile phone or an on-board equipment. For another example, in a case where the camera is a component contained in a mobile phone, the location determiner 120 may be implemented by utilizing various mobile locating technologies such as those based on Cell-ID/Cell-ID+RTT (Round Trip Time), Observed Time Difference Of Arrival (OTDOA), Assisted Global Positioning Systems (A-GPS) and so on. It should be noted that the present disclosure is not limited thereto, and any existing or future developed location determining technologies may be utilized to implement the location determiner 120.

The location signing embedder 130 may generate at least one location signature for the video stream signal sequences generated by the video generator 110, and implant the location signature into the video stream signal sequences. As shown, the location signature may be generated for example based on the user A's location private key. The user A may be for example the author of the video or any other person or entity associated with the copyright of the video. Similarly, for example, the location signing embedder 130 may be a separate apparatus, or a component contained in a device such as a mobile phone or an on-board equipment. In a case where the location signing embedder 130 is a separate apparatus, it may receive the video stream signal sequences generated by the video generator 110 and/or the location data determined by the location determiner 120 through various wireless communication technologies such as Code Division Multiple Access (CDMA), Time Division Multiple Address (TDMA), frequency division multiple access (FDMA), Orthogonal Frequency Division Multiple Access (OFDMA), Single-carrier Frequency-Division Multiple Access (SC-FDMA), and so on. For example, the location signing embedder 130 may be implemented by performing the location data signing and embedding procedure shown in FIG. 3.

The copyright watermark encoder 140 may hide at least two copyrighted watermark data into the location signed video stream signal sequences provided by the location signing embedder 130. As shown, each copyrighted watermark data may be generated based on each of the authorization public keys of the copyright owners B and C. Although two copyright owners are shown in FIG. 1, there may be two or more copyright owners in practical application. For example, the copyright watermark encoder 140 may receive the signed video stream signal sequences provided by the location signing embedder 130 through various wired or wireless communication technologies. Further, for example, the copyright watermark encoder 140 may be implemented by performing the copyright watermark encoding procedure shown in FIG. 9.

The copyright watermark decoder 150 or 150' may decipher the hidden copyrighted watermark data from the signed copyrighted video stream provided by the copyright watermark encoder 140. As shown, the copyright watermark decoder 150 may decipher the hidden copyrighted watermark data based on the copyright owner C's authorization private key, and the copyright watermark decoder 150' may decipher the hidden copyrighted watermark data based on the copyright owner B's authorization private key. For example, the copyright watermark decoder 150 or 150' may be a separate apparatus or a component contained in a device such as the video server 170 or 170'. Further, for example, the copyright watermark decoder 150 or 150' may receive the signed copyrighted video stream provided by the copyright watermark encoder 140 and/or provide the processed video stream to the video server 170 or 170' through various wired or wireless communication technologies. Further, for example, the copyright watermark decoder 150 or 150' may be implemented by performing the copyright watermark decoding procedure shown in FIG. 10.

The location signing extractor 160 may extract and verify the location signature from the processed video stream provided by the copyright watermark decoder 150, and provide the location data upon successful verification. Additionally, the location signing extractor 160 may provide a sketch vector array as described hereinafter to the sketch abstractor 180. As shown, the location signature may be decrypted based on the user A's location public key. For example, the location signing extractor 160 may be a separate apparatus or a component contained in a device such as the video server 170. Further, for example, the location signing extractor 160 may receive the processed video stream provided by the copyright watermark decoder 150 and/or provide the processed video stream to the video server 170 through various wired or wireless communication technologies. Further, for example, the location signing extractor 160 may be implemented by performing the location data signature verifying and extracting procedure shown in FIG. 6.

The video server 170 or 170' may host the copyrighted videos with/without location data. As shown, the video server 170 receives the copyrighted videos with location data from the location signing extractor 160, and the video server 170' receives the copyrighted videos without location data from the copyright watermark decoder 150'. For example, the video server 170 or 170' may receive the copyrighted videos with/without location data through various wired or wireless communication technologies. Further, for example, the video server 170 or 170' may be any existing or future developed video server capable of hosting videos.

The sketch abstractor 180 may receive a sketch vector array provided by the location signing extractor 160, and refine the sketch vector array into a sketch abstract vector array. For example, the sketch abstractor 180 may be a separate apparatus or a component contained in a device such as the web server 190. Further, for example, the sketch abstractor 180 may receive the sketch vector array provided by the location signing extractor 160 and/or provide the sketch abstract vector array to the web server 190 through various wired or wireless communication technologies. Further, for example, the sketch abstractor 180 may be implemented by performing the sketch abstracting procedure shown in FIG. 8.

The web server 190 may store the sketch abstract vector array provided by the sketch abstractor 180, for users' query, preview and exhibition. For example, the web server 190 may receive the sketch abstract vector array through various wired or wireless communication technologies. Further, for example, the web server 190 may be any existing or future developed web server allowing for users' query, preview and exhibition.

Figure 2:
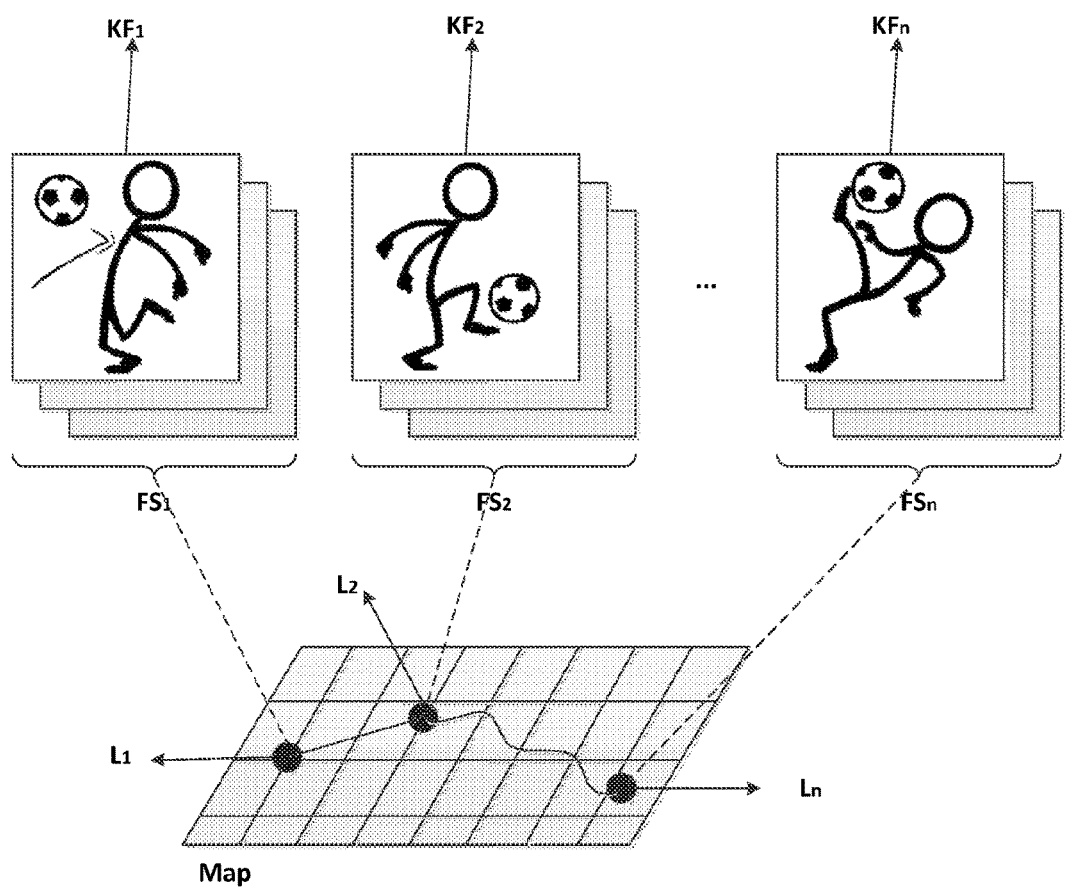
FIG. 2 depicts an example of the structure of frame sets with location data.

FIG. 2 depicts an example of the structure of frame sets with location data. In this depicted example, the video stream comprises n frame sets ($FS_1, FS_2, \ldots, FS_n$) each corresponding to a location data $L_i$ (i=1, ... n). For each frame set $FS_i$, a key frame $KF_i$ may be determined. As a simplest example, the key frame $KF_i$ may be the first frame in the frame set $FS_i$. However, the present disclosure is not limited thereto, and the key frame $KF_i$ may be any one frame in the frame set $FS_i$. Alternatively, instead of determining the key frame based on the location data (e.g., the first frame received each time when the value of the location data has changed by a predetermined amount may be determined as a key frame), the key frame may be determined by using any existing key frame detection methods such as those based on dynamic planning, clustering and so on. In this case, one location data $L_i$ might correspond to several key frames.

Figure 3:
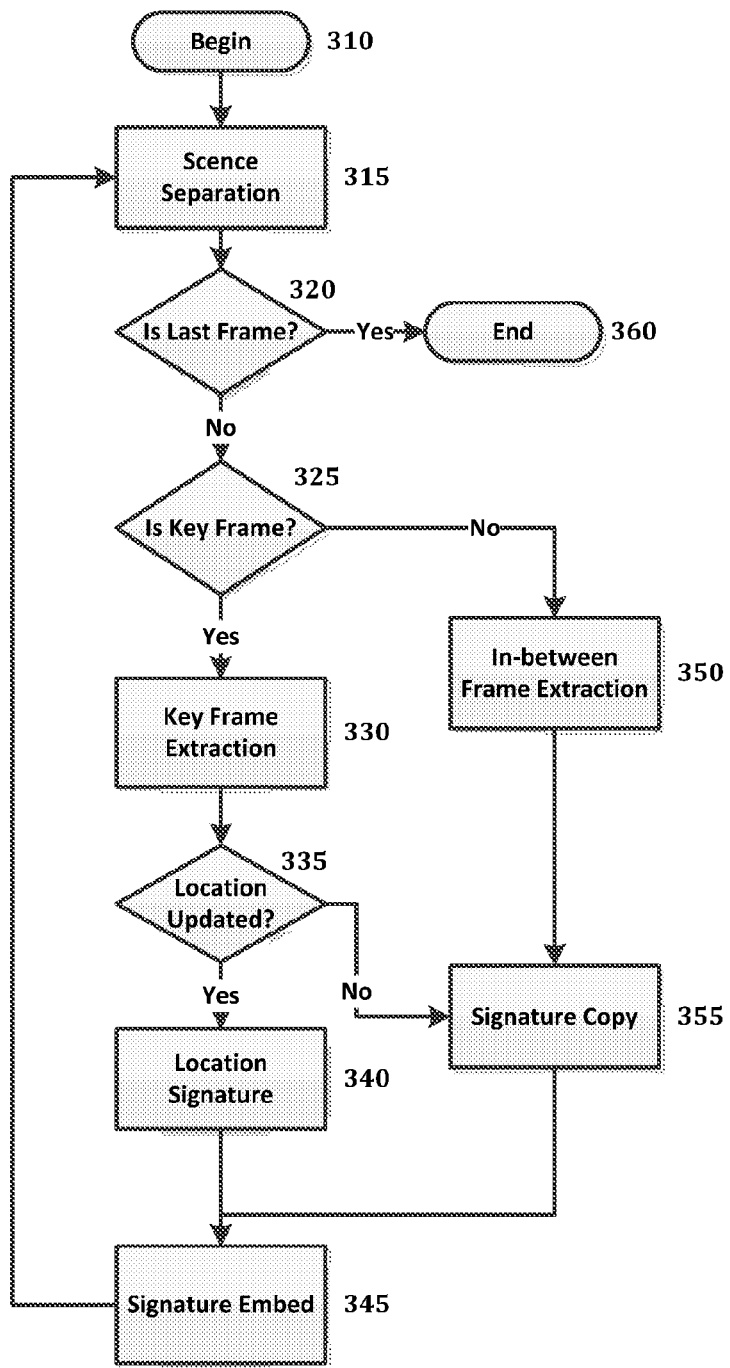
FIG. 3 is a flowchart showing the location data signing and embedding procedure according to an embodiment.

FIG. 3 is a flowchart showing the location data signing and embedding procedure according to an embodiment. The procedure may begin in step 310. Then, in step 315, the received video frame may be separated as a key frame or an in-between frame. The determination about the key frame has been described above, and will not be detailed here. Then, in step 320, it may be determined whether or not the current frame is the last frame. If it is determined in step 320 that the current frame is the last frame, the procedure may end in step 360.

On the other hand, if it is determined in step 320 that the current frame is not the last frame, it may be determined in step 325 whether or not the current frame is a key frame. If it is determined in step 325 that the current frame is the key frame, the current frame may be extracted from the video stream in step 330. Then, in step 335, it may be determined whether or not the location data has been updated.

If it is determined in step 335 that the location data has been updated, the location signature may be generated in step 340. For example, the location data $L_i$ may be signed with the user A's location private key $sk_L^A$ into a location signature $sig_i$ as shown in the following equation:

$$sig_i = \text{Sign}(sk_L^A, L_i)$$

wherein Sign( ) denotes a signing function. For example, the signing function may be any existing or future developed encryption algorithms based on public and private keys (e.g., RSA algorithm, SHA-256 algorithm, and so on).

On the other hand, if it is determined in step 325 that the current frame is not a key frame, the current frame (i.e. the in-between frame) may be extracted from the video stream. Then, in step 355, the location signature generated for corresponding key frame may be copied. Additionally, if it is determined in step 355 that the location data has not been updated, the procedure also proceeds to step 355 to copy the location signature generated for corresponding key frame (i.e., the immediately previous key frame).

Then, in step 345, the location signature may be embedded into the current frame. For example, for the key frame from step 340, the embedding operation may be represented as follows:

$$KF_i = Emb_L(Sig_i, KF_i)$$

and for the in-between frame from step 355, the embedding operation may be represented as follows:

$$IFS_{KF_i} = Emb_L(Sig_i, IFS_{KF_i})$$

wherein $Emb_L( )$ denotes the location signature embedding function, $IFS_{KF_i}$ denotes the in-between frame set for $KF_i$. For example, the location signature embedding function may be implemented by performing the location signature embedding algorithm shown in FIG. 5.

As another example, instead of embedding only the location signature data, a location signature data structure $Sig\_data_i$ shown below may be embedded into the video frames:

$$Sig\_data_i = (time, seqno, L_i, Sig_i)$$

wherein time denotes the record timestamp for the key frame $KF_i$, seqno denotes the global sequence number of the key frame $KF_i$, $L_i$ denotes the location data of the key frame $KF_i$. For example, the parameter time may be provided by the location determiner 120 (e.g., a GPS receiver), the video generator 110, the location signature embedder 130 and so on, and the parameter seqno may be provided by the video generator 110. In this case, the embedding operation for the key frame and the in-between frame may be shown as follows respectively:

$$KF_i = Emb_L(Sig\_data_i, KF_i)$$

$$IFS_{KF_i} = Emb_L(Sig\_data_i, IFS_{KF_i})$$

It should be noted that although it is shown in FIG. 3 that the location signature data or data structure is embedded into both the key frames and the in-between frames, the present disclosure is not limited thereto. For example, the location signature data or data structure may also be only embedded into the key frames.

Figure 5:
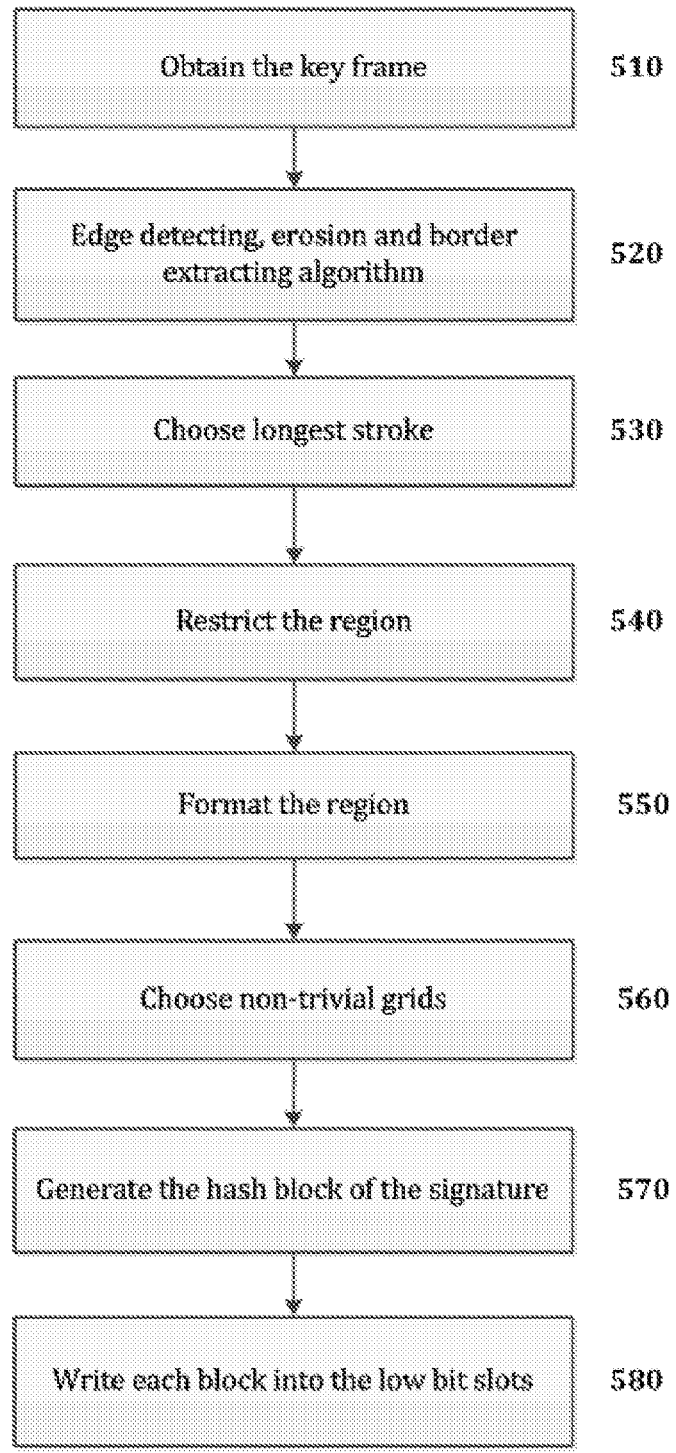
FIG. 5 is a flowchart showing the location signature embedding algorithm according to an embodiment.

FIG. 5 is a flowchart showing the location signature embedding algorithm according to an embodiment. Based on the fact that human is not sensitive to the colour of the stroke/border in an image, the location signature embedding algorithm firstly seeks out the longest stroke/border in the frame $KF_i$ or $IFS_{KF_i}$, and then write the location signature data $Sig_i$ or the location signature data structure $Sig\_data_i$ into the frame through a transparent watermarking algorithm.

The location signature embedding algorithm may begin in step 510 in which the key frame may be obtained. Then, in step 520, an edge detecting, erosion or border extracting algorithm may be called to find all strokes in the frame. The exemplary example of the edge detecting, erosion or border extracting algorithm may comprise, but not limited to, edge detection based on gray-level histogram, edge detection based on gradient (e.g., Roberts operator, Sobel operator, Prewitt operator, and so on), imerode function in MATLAB, and any other existing or future developed edge detecting, erosion or border extracting algorithm.

Figure 4:
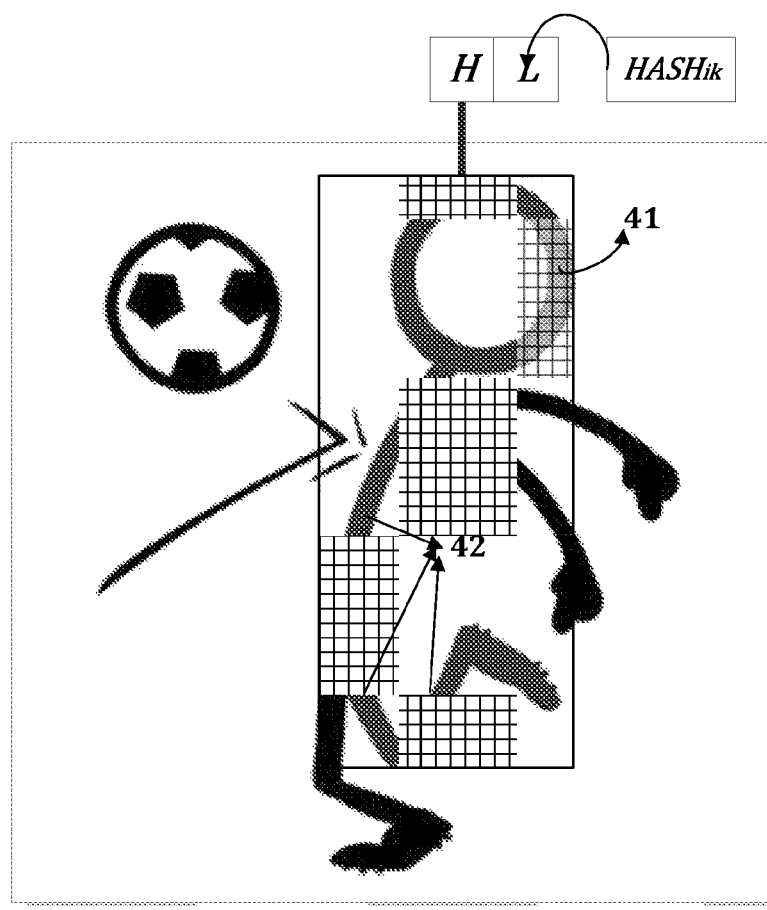
FIG. 4 depicts an example of embedding the location signature data into the longest stroke in a frame.

Then, in step 530, the longest stroke may be chosen among all strokes. In the depicted example of FIG. 4, the circle 41 and the curve 42 are chosen as the longest stroke. Then, in step 540, the embedding region may be restricted. For example, the smallest rectangle enclosing the longest stroke may be defined as the embedding region. Then, in step 550, the embedding region may be formatted. For example, the embedding region maybe formatted into grids with fixed number and size, as shown in FIG. 4.

Then, in step 560, non-trivial t grids may be chosen. For example, if ratio of the area in a grid occupied by the longest stroke to the total area of the grid is larger than a predetermined value (e.g., 50% and so on), the grid may be chosen as a non-trivial grid. Further, in an exemplary example, the chosen non-trivial t grids may be continuous in topology.

Then, in step 570, t hash blocks of the location signature may be generated. For example, the hash blocks may be generated by using any existing hash function. Then, in step 580, the hash blocks may be written into the low bits of the t grids. For example, the hash blocks may replace the low bits or be XORed with the low bits of the t grids.

Figure 6:
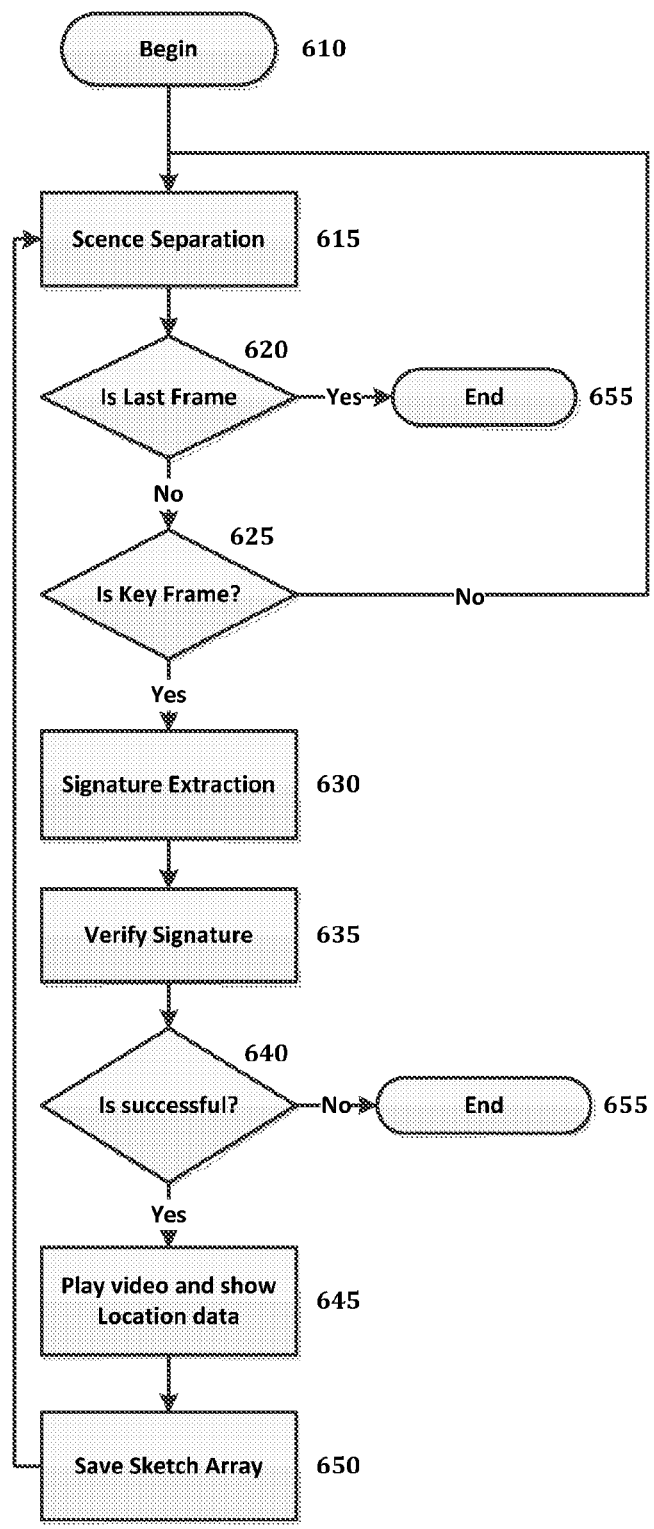
FIG. 6 is a flowchart showing the location data signature verifying and extracting procedure according to an embodiment.

FIG. 6 is a flowchart showing the location data signature verifying and extracting procedure according to an embodiment. The procedure may begin in step 610. Then, in step 615, the received video frame may be separated as a key frame or an in-between frame. The determination about the key frame has been described above, and will not be detailed here. Then, in step 620, it may be determined whether or not the current frame is the last frame. If it is determined in step 620 that the current frame is the last frame, the procedure may end in step 655.

On the other hand, if it is determined in step 620 that the current frame is not the last frame, it may be determined in step 625 whether or not the current frame is a key frame. If it is determined in step 625 that the current frame is not the key frame, the procedure may proceed to step 615 because the same location signature data is embedded into the key and in-between frame.

On the other hand, if it is determined in step 625 that the current frame is the key frame, the location signature data structure may be extracted in step 630. For example, the extracting operation may be represented as follows:

$$\text{Sig\_data}_i = \text{Extr}_L(KF_i)$$

wherein $\text{Extr}_L(\ )$ denotes the extracting function for location signature. For example, the location signature extracting function may be implemented by performing the location signature extracting algorithm shown in FIG. 7.

Then, in step 635, the location signature may be verified. For example, the verifying operation may be represented as follows:

$$succ = Vrfy_L(pk_L^A, \text{sig}_i, KF_i)$$

wherein $\text{Extr}_L(\ )$ denotes the extracting function for location signature, $pk_L^A$ denotes the location public key of the user A, succ denotes a logic variable indicating whether or not the verification is successful. For example, the extracting function may be any existing or future developed decryption algorithms based on public and private keys.

Then, in step 640, it may be determined whether or not the verification is successful. If it is determined in step 640 that the verification is not successful, the procedure may end in step 655. On the other hand, if it is determined in step 640 that the verification is successful, it may cause the video stream to be played and the location data to be shown.

Optionally, in step 650, the sketch vector array may be saved. For example, the sketch vector array may be represented as $\langle KF_i, L_i \rangle$, and may be provided to the sketch abstractor 180.

Figure 7:
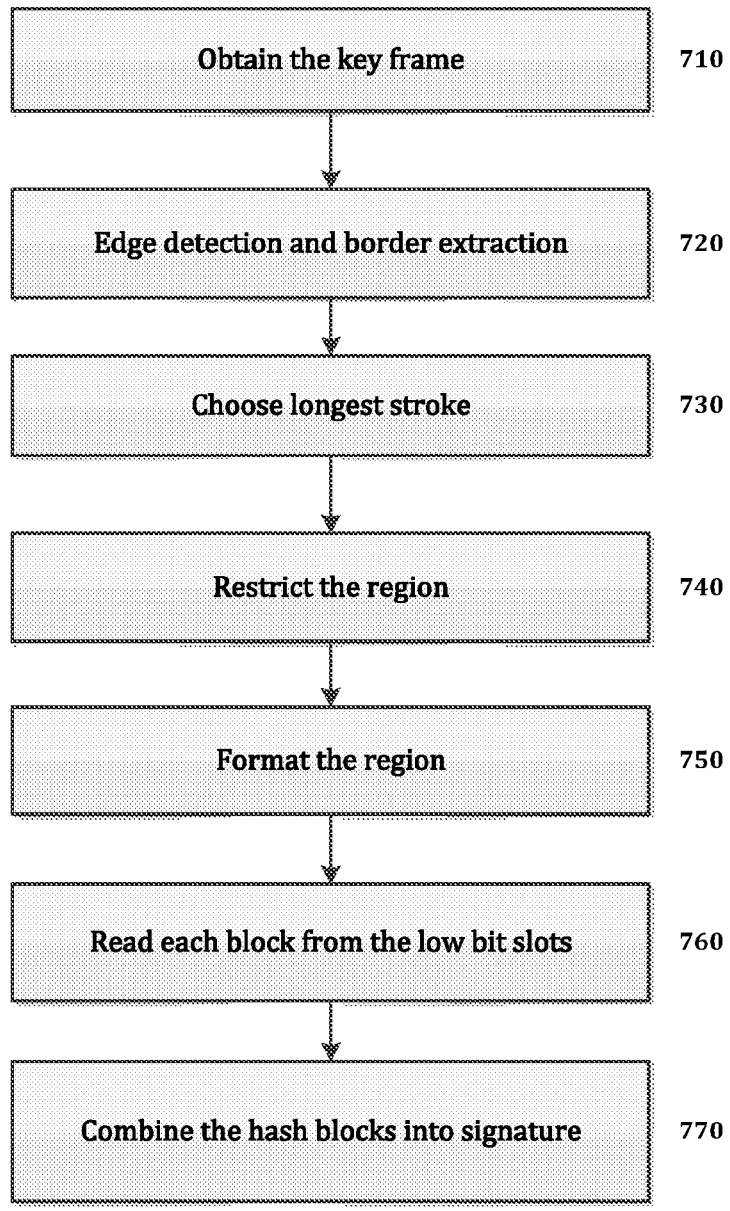
FIG. 7 is a flowchart showing the location signature extracting algorithm according to an embodiment.

FIG. 7 is a flowchart showing the location signature extracting algorithm according to an embodiment. Because the embedding algorithm is reversible, the extracting algorithm is similar. The location signature extracting algorithm may begin in step 710 in which the key frame may be obtained. Then, in step 720, an edge detecting, erosion or border extracting algorithm may be called to find all strokes in the frame. The exemplary example of the edge detecting, erosion or border extracting algorithm have been described above, and will not be detailed here.

Then, in step 730, the longest stroke may be chosen among all strokes. In the depicted example of FIG. 4, the circle 41 and the curve 42 are chosen as the longest stroke. Then, in step 740, the embedding region may be restricted. For example, the smallest rectangle enclosing the longest stroke may be defined as the embedding region. Then, in step 750, the embedding region may be formatted. For example, the embedding region maybe formatted into grids with fixed number and size, as shown in FIG. 4.

Then, in step 760, each hash block may be read from the low bit slots of non-trivial t grids. For example, if ratio of the area in a grid occupied by the longest stroke to the total area of the grid is larger than a predetermined value (e.g., 50% and so on), the grid may be chosen as a non-trivial grid. Further, in an exemplary example, the chosen non-trivial t grids may be continuous in topology. Then, in step 770, t hash blocks of the location signature may be combined into the location signature.

Figure 8:
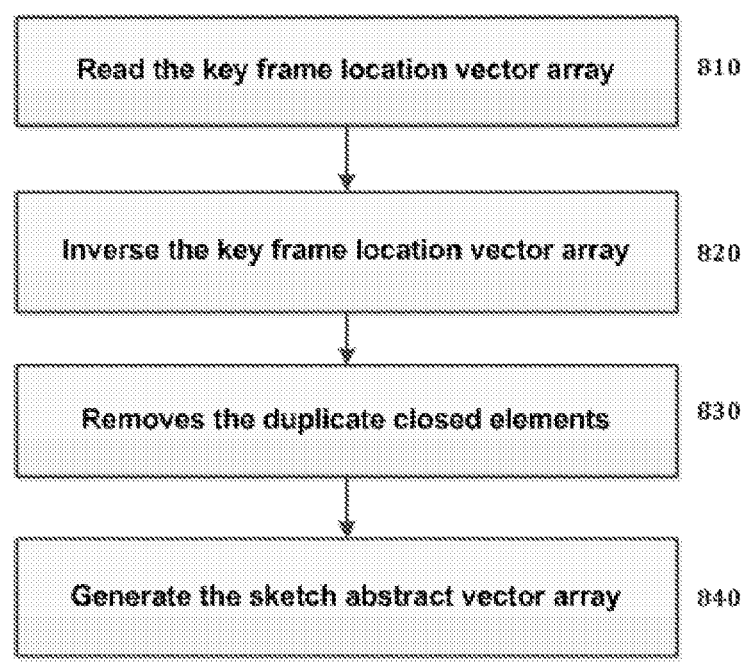
FIG. 8 is a flowchart showing the sketch abstracting procedure according to an embodiment.

FIG. 8 is a flowchart showing the sketch abstracting procedure according to an embodiment. Because of the large capacity of the sketch vector array, it is necessary to refine it into a leaner one. In some applications, only one key frame is enough to represent the scenario. The sketch abstracting procedure is based on this assumption.

In step 810, the sketch vector array may be read. For example, the sketch vector array $\langle KF_i, L_i \rangle$ may be read from the location signing extractor 160. Then, in step 820, each element of the sketch vector array may be inversed into the format $\langle L_i, KF_i \rangle$.

Then, in step 830, duplicate vectors whose location data's values are close to each other may be removed. As a simplest example, the range of values of all location data may be equally divided into multiple parts, and for each part, the first key frame may be reserved and all the other key frames in this part may be removed. However, the present disclosure is not limited thereto, and the range of values of all location data may also be unequally divided depending upon the density of the sketch vector array over the location axis, and for each divided part, any one frame in this part may be chosen as the only one reversed frame. As another example, the location data of all vectors may be clustered by distance, and for each formed cluster, any one frame in this cluster may be chosen as the only one reversed frame.

Then, in step 840, the sketch abstract vector array may be generated. For example, the inversed sketch vector array provided from step 830 may be inversed again to generate the sketch abstract vector array.

It should be noted that steps 820 and 840 may be omitted so long as the sketch vector array may be mapped onto a location axis, since inversing the sketch vector array is only one specific manner for mapping the sketch vector array onto the location axis. For example, the mapping process may also be implemented by generating an array $\langle L_i, i \rangle$.

Figure 9:
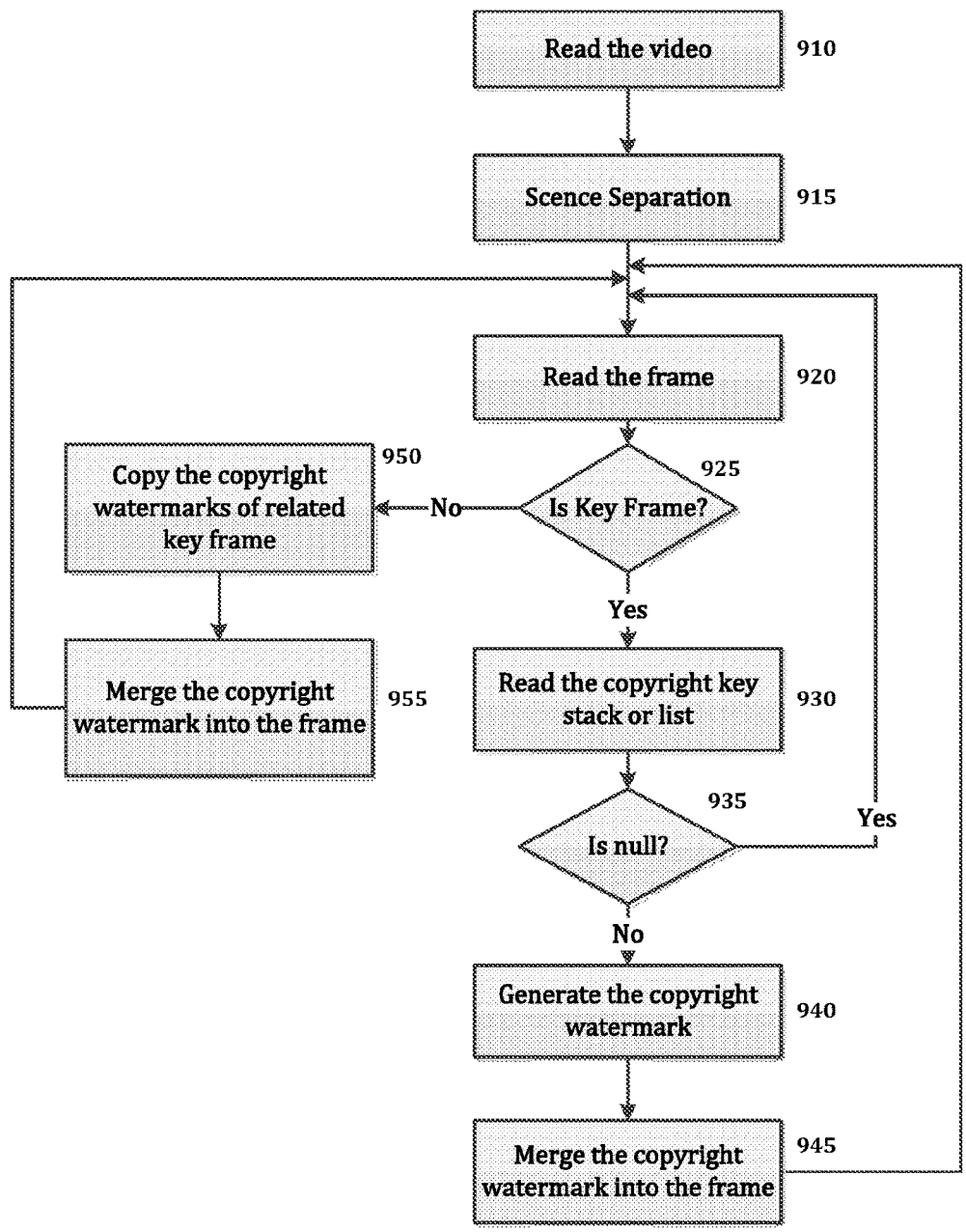
FIG. 9 is a flowchart showing the copyright watermark encoding procedure according to an embodiment.

FIG. 9 is a flowchart showing the copyright watermark encoding procedure according to an embodiment. The procedure may begin in step 910 in which the video may be read. For example, the video may be provided from the location signature embedder 130. Then, the video may be separated into at least one key frame and at least one in-between frame set for the at least one key frame in step 915. Then, in step 920, a frame may be read. Then, in step 925, it may be determined whether or not the current read frame is a key frame. If it is determined in step 925 that the current frame is the key frame, the copyright key stack or list may be read in step 930. For example, the copyright key or list may comprise at least two copyright public keys. Then, in step 935, it may be determined whether or not the copyright key stack or list is null. If it is determined in step 935 that the copyright key stack or list is null, the procedure may proceed to step 920 in which a next frame may be read.

On the other hand, if it is determined in step 935 that the copyright key stack or list is not null, the copyright watermark may be generated in step 940. For example, firstly, the key frame $KF_i$ may be encrypted into copyright cipher $WC_{ij}$ with user public copyright key $pk_C^j$, wherein $WC_{ij}$ denotes the copyright cipher of user j, and $pk_C^j$ denotes the copyrighted publickey of user j. This operation may be represented as followings:

$$WC_{ij}=Enc(pk_C^j,KF_i), i=1,\ldots,n; j=1,\ldots,m$$

wherein Enc( ) denotes the copyright watermark encryption function. For example, the copyright watermark encryption function may be any existing or future developed encryption algorithms based on public and private keys (e.g., RSA algorithm, SHA-256 algorithm, and so on). Then, a watermark generation function may be called to produce the watermark layers $WL_{ij}$ for all the users, wherein $WL_{ij}$ denotes the watermark layer of user j. This operation may be represented as follows:

$$WL_{ij}=WmGen(WC_{ij}), i=1,\ldots,n; j=1,\ldots,m$$

wherein WmGen( ) denotes the copyright watermark generation function. For example, the copyright watermark generation function may be any existing or future developed watermark generation function such as hash algorithm.

Then, in step 945, the copyright watermark may be merged into the current frame. For example, this operation may be represented as follows:

$$KF_i=Emb_C(\{WL_{ij}\}_{j=1}^m,KF_i), i=1,\ldots,n; j=1,\ldots,m$$

wherein $Emb_C( )$ denotes the copyright watermark embedding function, and $\{WL_{ij}\}_{j=1}^m$ denotes a stack/array watermark layer structure. For example, the copyright watermark embedding function may be any existing or future developed watermark embedding algorithm such as those based on wavelet transformation, histogram, and so on. Further, the implementation for the stack/array watermark layer structure will be described later with reference to FIGS. 13-14.

On the other hand, if it is determined in step 925 that the current frame is not the key frame, the copyright watermarks of the corresponding key frame may be copied. Then, in step 955, the copied copyright watermarks may be merged into the current frame (i.e. the in-between frame).

Figure 10:
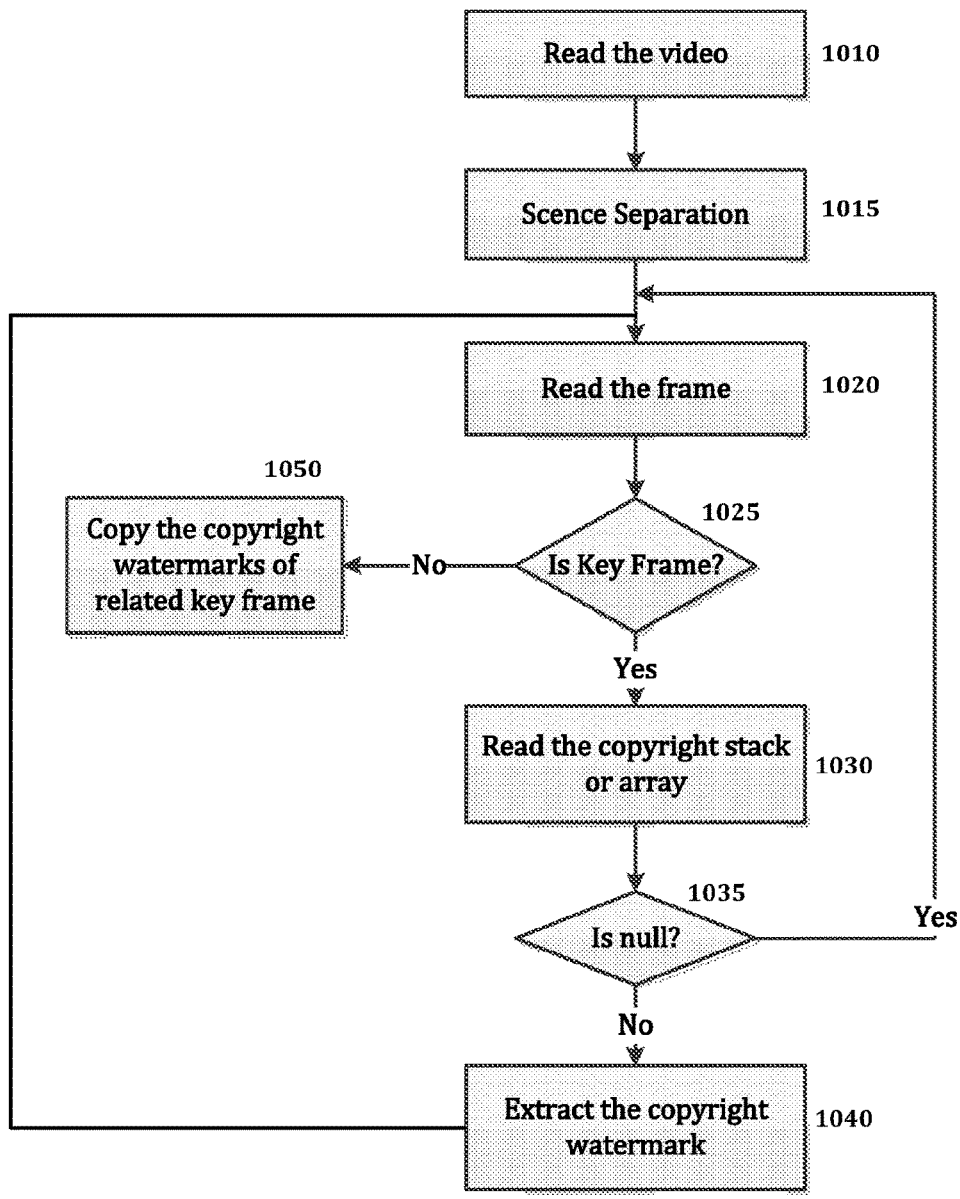
FIG. 10 is a flowchart showing the copyright watermark decoding procedure according to an embodiment.

FIG. 10 is a flowchart showing the copyright watermark decoding procedure according to an embodiment. The procedure may begin in step 1010 in which the video may be read. For example, the video may be provided from the copyright watermark encoder 140. Then, the video may be separated into at least one key frame and at least one in-between frame set for the at least one key frame in step 1015. Then, in step 1020, a frame may be read. Then, in step 1025, it may be determined whether or not the current read frame is a key frame. If it is determined in step 1025 that the current frame is the key frame, the copyright watermark layer stack or array may be read in step 1030. For example, the copyright watermark layer stack or array may be read by using any existing or future developed watermark extracting algorithm such as those based on wavelet transformation, histogram, and so on. Then, in step 1035, it may be determined whether or not the copyright watermark layer stack or array is null. If it is determined in step 1035 that the copyright watermark layer stack or array is null, the procedure may proceed to step 1020 in which a next frame may be read.

On the other hand, if it is determined in step 1035 that the copyright watermark layer stack or array is not null, a corresponding copyright watermark layer may be extracted from the copyright watermark layer stack or array. This operation will be described later with reference to FIGS. 13-14.

On the other hand, if it is determined in step 1025 that the current frame is not the key frame, the copyright watermarks of the corresponding key frame may be copied.

Figure 11:
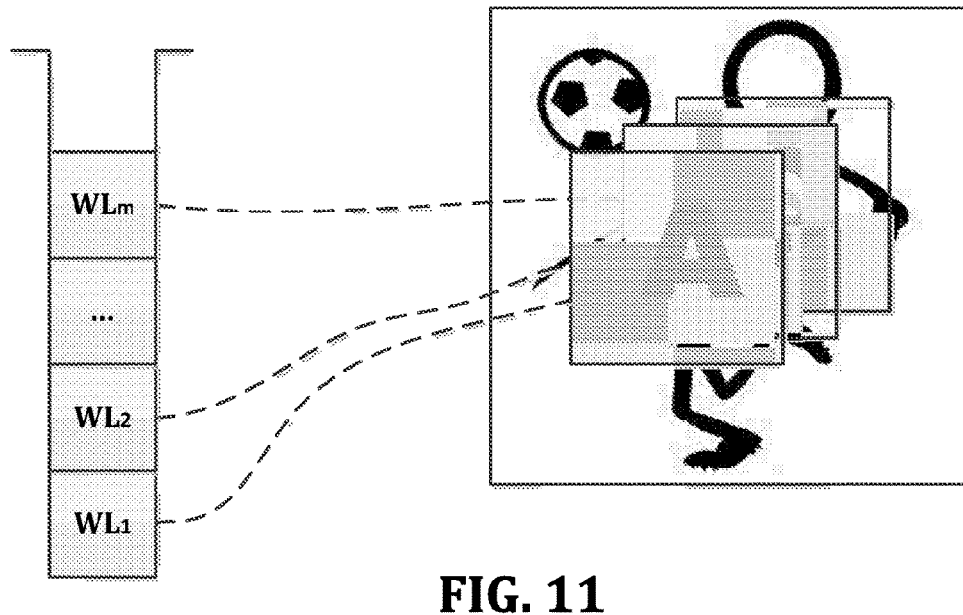
FIG. 11 depicts an example of a stack structure of copyright watermark layers.
Figure 12:
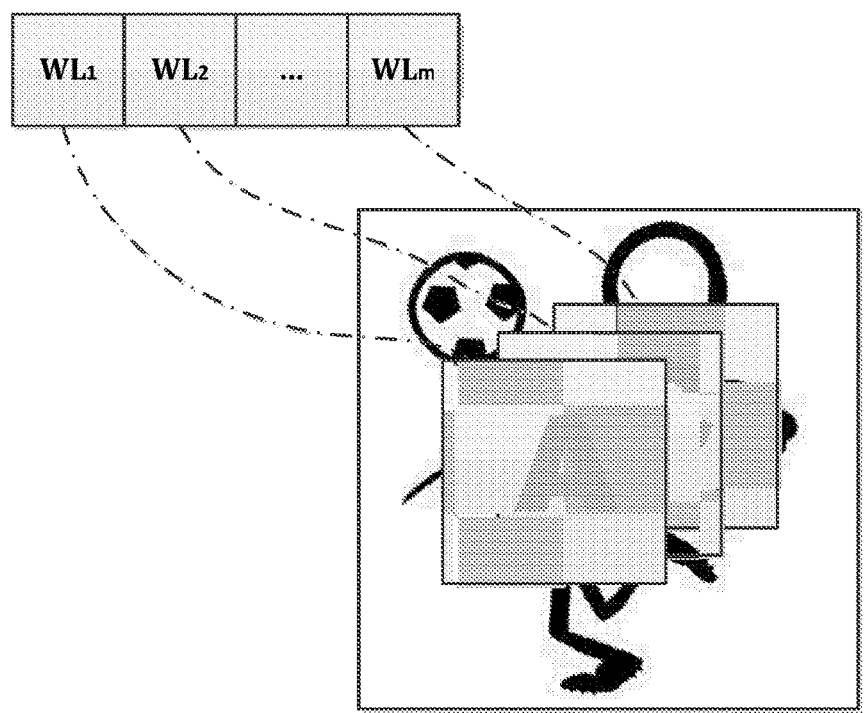
FIG. 12 depicts an example of an array structure of copyright watermark layers.

FIG. 11 depicts an example of a stack structure of copyright watermark layers, and FIG. 12 depicts an example of an array structure of copyright watermark layers. During the watermark decoding procedure, in stack structure, all the layers below $WL_i$ should be restored by extraction function and merged into the final video finally. That is, all the previous copyright watermarks should not be removed. However, in the array structure, an arbitrary user may extract his own watermark layer, without regard to the order of other copyrights watermark layer. Thus, the stack structure determines a stationary order of the copyright watermark layers, while the array one supports a flexible order.

Figure 13:
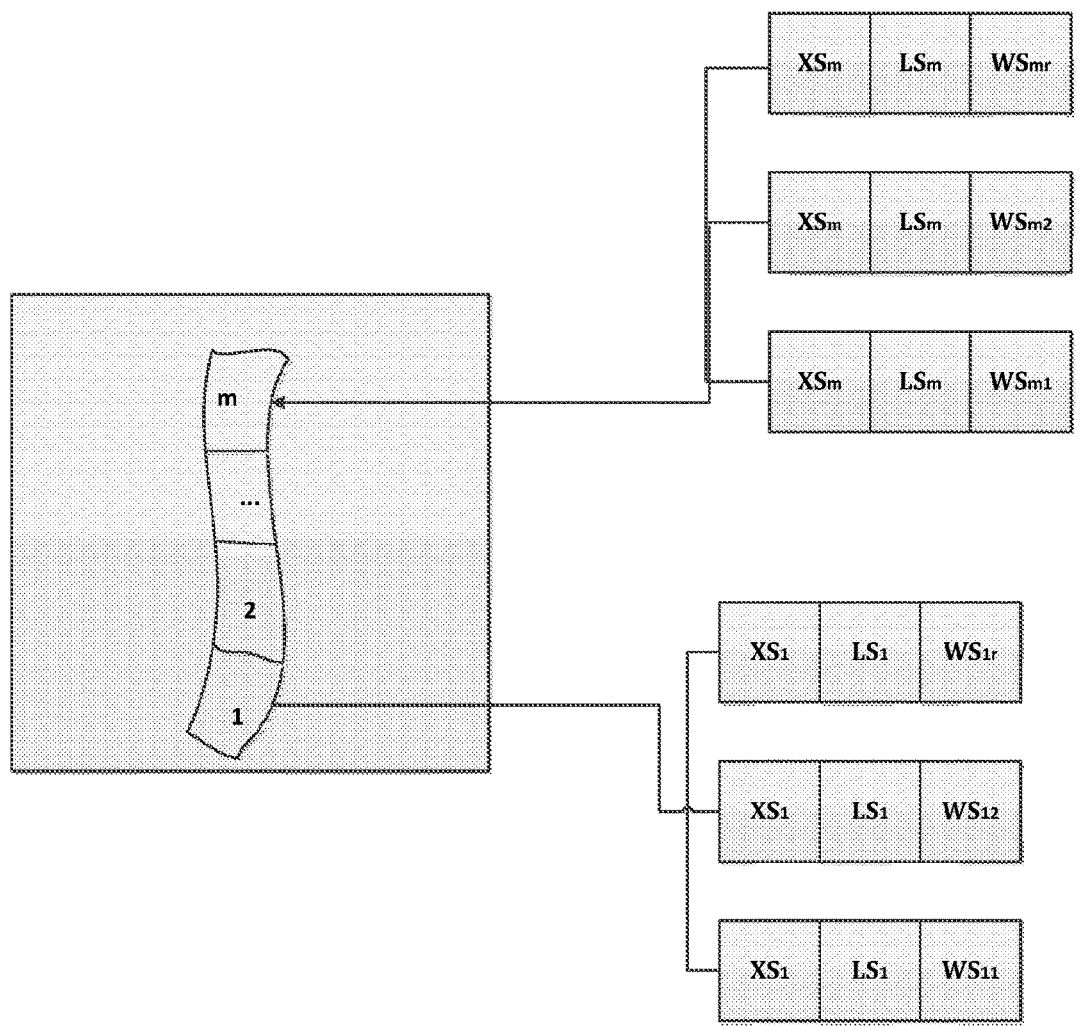
FIG. 13 shows the data structure for implementing a stack/array structure according to an embodiment.

FIG. 13 shows the data structure for implementing a stack/array structure according to an embodiment. As shown, the stack/array structure comprises m watermark layers, wherein $WS_k=(WS_{k1}, WS_{k2}, \ldots, WS_{kr})$ (k=1, \ldots, m) is a signature of $WL_k=(WL_{k1}, WL_{k2}, \ldots, WL_{kr})$, and $WL_k$ is the k-th watermark layer which is composed of r parts. Every part is hash code with fixed length. Thus, the basic storage unit could be written as a triple $(XS_i, LS_i, WS_{ij})$, wherein $XS_i$ denotes the i-th location of the stack or array, $LS_i$ represents the i-th layer signature. The implementation of $XS_i$ and $LS_i$ will be described later with reference to FIGS. 14A and 14B.

Figure 14A:
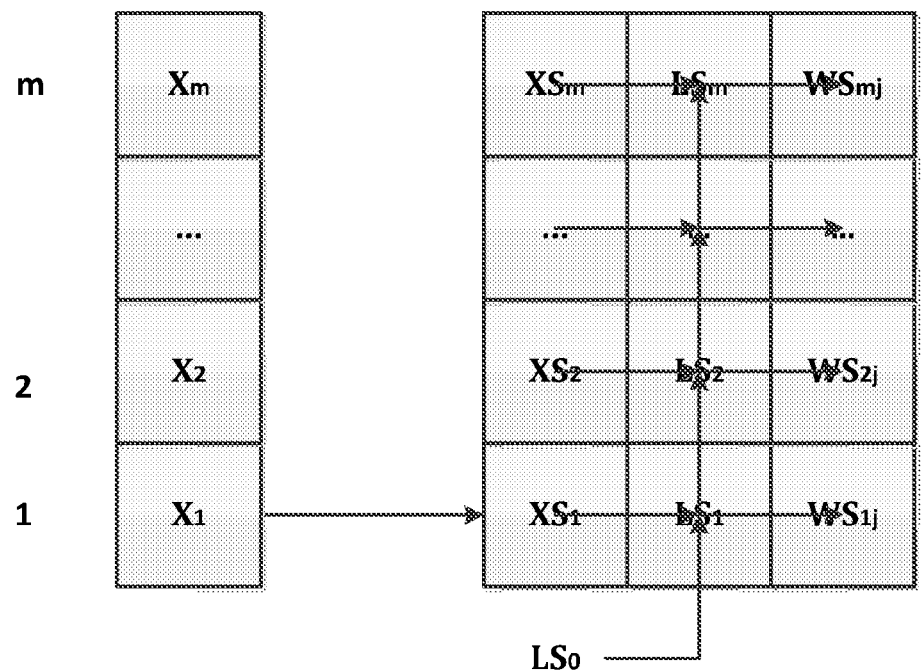
FIGS. 14A and 14B show the data relationship for a stack structure and an array structure, respectively.
Figure 14B:
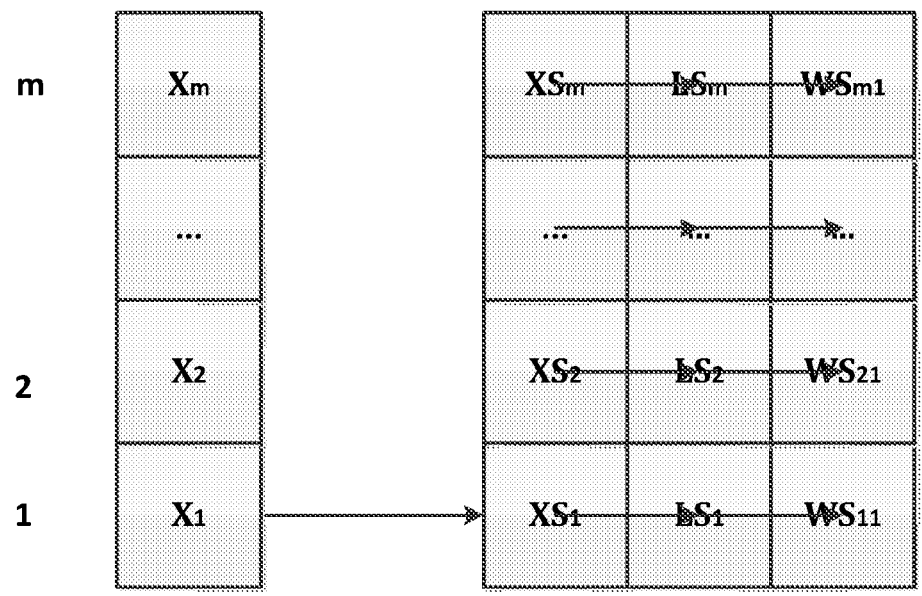

FIGS. 14A and 14B show the data relationship for a stack structure and an array structure, respectively. As shown in FIG. 14A, in the stack structure, the data relation is represented by the $LS_i$. Given a pre-known $LS_0$, the $LS_1$ is calculated by $Sig(XS_1, LS_0)$, then all the latter ones may be evaluated by their previous ones as shown in below equations:

$$LS_1 = Sig(XS_1, LS_0)$$

$$LS_k = Sig(XS_k, LS_{k-1})$$

Then the $WS_{kj}$ is obtained by data $WL_{kj}$ and the key $LS_k$, as shown in the below equation:

$$WS_{kj} = Sig(WL_{kj}, LS_k)$$

Hence, if one needs to get a watermark in the stack, he should know the entire key $LS_k$ on the top of it. Here, it should be noted that all keys on top of $LS_k$ denote $LS_1$, $LS_2$, ..., $LS_{k-1}$, although it is shown in FIG. 14A and FIG. 14B that $LS_k$ is on top of $LS_1$, $LS_2$, ..., $LS_{k-1}$.

As shown in FIG. 14B, in the array structure, the data relation is simpler than that in the stack structure. Every layer signature $LS_i$ is determined by the pre-known $LS_0$. So they are independent of one another. As same as the implementation in the stack structure, the $WS_{kj}$ is obtained by data $WL_{kj}$ and the key $LS_k$, as shown in below equations:

$$LS_k = Sig(XS_k, LS_0)$$

$$WS_{kj} = Sig(WL_{kj}, LS_k)$$

It should be noted that in order to protect the layer from damage by other layers, the storage units ($XS_i$, $LS_i$, $WS_{ij}$) may also be shuffled in a random order, because the $XS_i$ could be presented as the logical location and relation between units. As one exemplary example, $X_i$ is a chaotic integer sequence, and the $XS_i$ is signature of $X_i$ with a common key $k_{comm}$ of all copyright owners.

Given an initial value $c_0$, parameter a, m, and number of iterations n, a chaotic integer sequence $\{c_k; k=0, 1, 2, 3, ...\}$ is determined by the following equations:

$$c_{k+1} = f_a(c_k) = \begin{cases} \lceil (\frac{m}{a})c_k \rceil, & 1 \leq c_k \leq a \\ \lceil \frac{m(m-c_k)}{m-a} \rceil, & a \leq c_k \leq m \end{cases}$$

$$c_{k+1} = f_a^n(c_k)$$

In this way, the users who are not the copyright owners cannot guess the location of the stack or array because the chaotic integer sequence is stochastic, and sensitive to the initial values.

Then $X_i$ may be a chaotic sequence composed of fixed number of chaotic integer, as shown in the below equations:

$$\{X_i = c_k c_{k+1} \ldots c_{k+s-1}; k=0, s, \ldots, is\}$$

$$XS_i = Sig(X_i, k_{comm})$$

Because the methods of chaotic integer sequence and signature are all reversible, so the decoding procedure is easy to be implemented.

Figure 15:
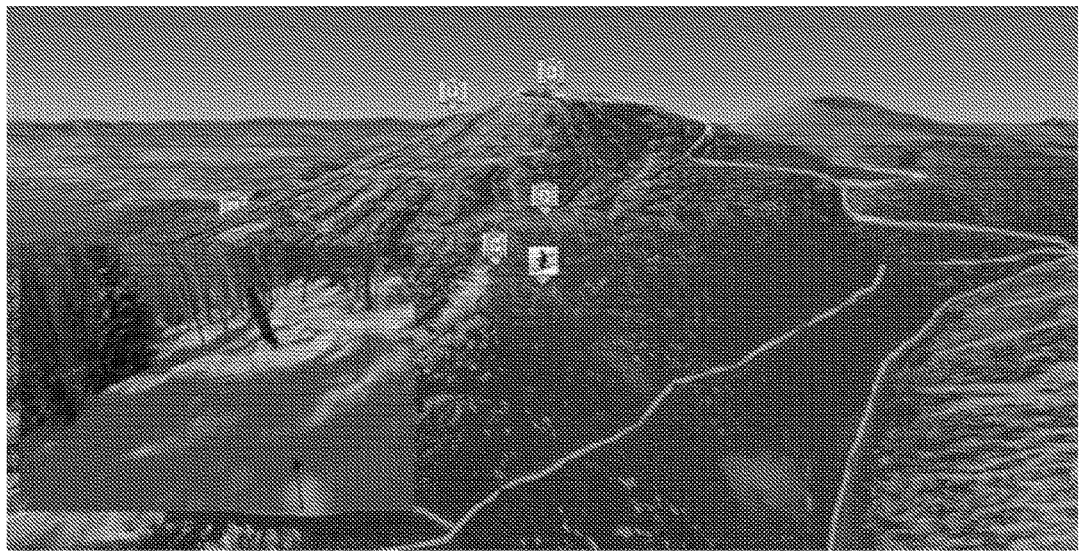
FIG. 15 shows an exemplary application scenario of the present disclosure regarding video with GPS location in a sport game.
Figure 16:
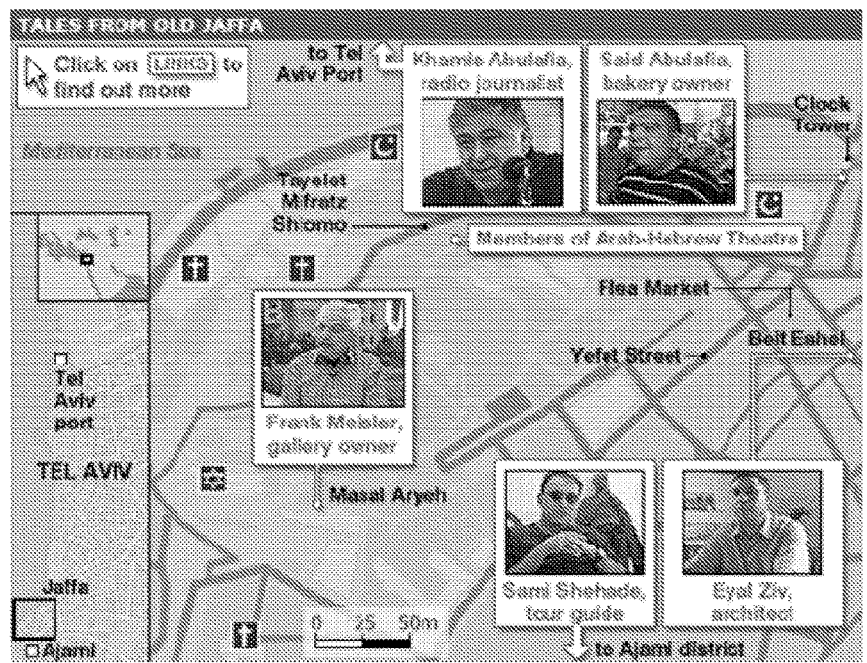
FIG. 16 shows an exemplary application scenario of the present disclosure regarding News videos with locations in a block map.

FIG. 15 shows an exemplary application scenario of the present disclosure regarding video with GPS location in a sport game. In this scenario, the live video may be played with the GPS location data being shown simultaneously. Further, FIG. 16 shows an exemplary application scenario of the present disclosure regarding News videos with locations in a block map. In this scenario, news video may be played with the location data being shown in a block map.

Based on the above description, the following advantageous technical effects can be achieved in the present disclosure:

(1) Because location signature is embedded into video stream and the signature verification is performed, the video content can possess its location information about where it takes place, and it can make the video publishing procedure authentic.

(2) Because the same location signature is embedded into the key and in-between frame, the processing overhead can be reduced and it is easy to be integrated into conventional services, such as GIS or search engine.

(3) Because the location signature is embedded into the longest stroke in the video frame, it has little influence on the watching effect of the user.

(4) Because at least two copyright watermark layers can be embedded into the video in the form of a stack/array structure, some copyright information can be efficiently and flexibly implanted into the video for different copyright owners, and it can make the video publishing procedure legitimate.

(5) Because the sketch vector array can be refined into a leaner one, users' query, preview and exhibition can be facilitated.

Figure 17:
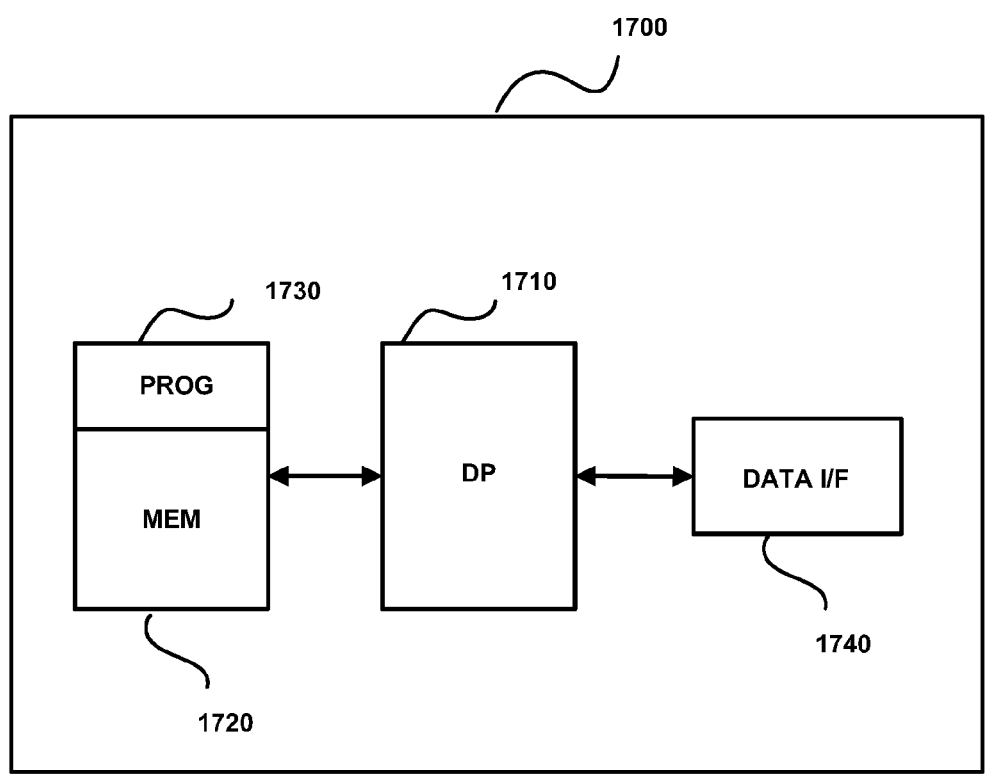
FIG. 17 is a simplified block diagram showing an apparatus that are suitable for use in practicing some exemplary embodiments of the present disclosure.

FIG. 17 is a simplified block diagram showing an apparatus that are suitable for use in practicing some exemplary embodiments of the present disclosure. For example, any one of the location signing embedder 130, the copyright watermark encoder 140, the copyright watermark decoders 150 and 150', the location signing extractor 160, and the sketch extractor 170 shown in FIG. 1 may be implemented through the apparatus 1700. As shown, the apparatus 1700 may include a data processor (DP) 1710, a memory (MEM) 1720 that stores a program (PROG) 1730, and a data interface 1740 for exchanging data with other external devices through wired communication, wireless communication, a data bus, and so on.

The PROG 1730 is assumed to include program instructions that, when executed by the DP 1710, enable the apparatus 1700 to operate in accordance with the exemplary embodiments of this disclosure, as discussed above. That is, the exemplary embodiments of this disclosure may be implemented at least in part by computer software executable by the DP 1710, or by hardware, or by a combination of software and hardware.

The MEM 1720 may be of any type suitable to the local technical environment and may be implemented using any suitable data storage technology, such as semiconductor based memory devices, flash memory, magnetic memory devices and systems, optical memory devices and systems, fixed memory and removable memory. The DP 1710 may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present disclosure includes any novel feature or combination of features disclosed herein either explicitly or any generalization thereof Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. An apparatus for embedding location information into a video, the apparatus comprising:
   at least one processor; and
   at least one memory including computer-executable code, wherein the at least one memory and the computer-executable code are configured to, with the at least one processor, cause the apparatus to:
   separate the video into at least one key frame and at least one in-between frame set corresponding to the at least one key frame;
   receive location data for the at least one key frame, wherein the location data comprises a location of a video generator while generating the video;
   encrypt the location data for the at least one key frame based on a location private key; and
   embed the encrypted location data into the at least one key frame.

2. The apparatus according to claim 1, wherein the computer-executable code are further configured to, when executed by the at least one processor, cause the apparatus to:
   embed the encrypted location data into each frame of the at least one in-between frame set.

3. The apparatus according to claim 1, wherein the computer-executable code are further configured to, when executed by the at least one processor, cause the apparatus to:
   detect a longest stroke from the at least one key frame; and
   embed the encrypted location data into the longest stroke.

4. The apparatus according to claim 2, wherein the computer-executable code are further configured to, when executed by the at least one processor, cause the apparatus to:
   detect a longest stroke from each frame of the at least one in-between frame set; and
   embed the encrypted location data into the longest stroke.

5. An apparatus for extracting location information from a video, the apparatus comprising:
   at least one processor; and
   at least one memory including computer-executable code, wherein the at least one memory and the computer-executable code are configured to, with the at least one processor, cause the apparatus to:
   separate the video into at least one key frame and at least one in-between frame set corresponding to the at least one key frame, wherein the separation is based on location data, wherein the location data comprises a location of a video generator while generating the video;
   extract encrypted location data from the at least one key frame; and
   decrypt the encrypted location data based on a location public key.

6. The apparatus according to claim 5, wherein the computer-executable code are further configured to, when executed by the at least one processor, cause the apparatus to:
   detect a longest stroke from the at least one key frame; and
   extract the encrypted location data from the longest stroke.

7. The apparatus according to claim 5, wherein the computer-executable code are further configured to, when executed by the at least one processor, cause the apparatus to:
   in response to the encrypted location data being decrypted successfully, cause to play the video and show the decrypted location data.

8. An apparatus for hiding at least first and second copyright watermark data into a video, the apparatus comprising:
   at least one processor; and
   at least one memory including computer-executable code, wherein the at least one memory and the computer-executable code are configured to, with the at least one processor, cause the apparatus to:
   separate the video into at least one key frame and at least one in-between frame set corresponding to the at least one key frame, wherein the separation is based on location data, wherein the location data comprises a location of a video generator while generating the video; and
   merge the at least first and second copyright watermark data into the at least one key frame.

9. The apparatus according to claim 8, wherein the computer-executable code are further configured to, when executed by the at least one processor, cause the apparatus to:
   merge the at least first and second copyright watermark data into each frame of the at least one in-between frame set.

10. The apparatus according to claim 8, wherein the computer-executable code are further configured to, when executed by the at least one processor, cause the apparatus to:

store the at least first and second copyright watermark data in a stack structure or an array structure; and merge the stack structure or the array structure into the at least one key frame.

11. The apparatus according to claim 10, wherein the computer-executable code are further configured to, when executed by the at least one processor, cause the apparatus to:

merge the stack structure or the array structure into each frame of the at least one in-between frame set.

12. An apparatus for decoding a copyright watermark data from a video, the apparatus comprising:

at least one processor; and at least one memory including computer-executable code, wherein the at least one memory and the computer-executable code are configured to, with the at least one processor, cause the apparatus to:

separate the video into at least one key frame and at least one in-between frame set corresponding to the at least one key frame, wherein the separation is based on location data, wherein the location data comprises a location of a video generator while generating the video;

read a data structure from the at least one key frame, the data structure having stored therein at least first and second copyright watermark data; and decode the first or second copyright watermark data according to a property of the data structure.

13. The apparatus according to claim 12, wherein the computer-executable code are further configured to, when executed by the at least one processor, cause the apparatus to:

when the data structure is an array structure, decode the first or second copyright watermark data based on its corresponding private key; and when the data structure is a stack structure, decode the first watermark data based on the first private key, and decode the second watermark data based on the first and second private keys, wherein the first watermark data is located on top of the second watermark data in the stack structure.

* * * * *